United States Patent [19]

Burniski

[11] 4,370,813

[45] Feb. 1, 1983

[54] AUTOMATIC SELF-LEVELING INSTRUMENT MOUNT

[76] Inventor: Edward W. Burniski, 152 Sharp St., Alden Station, Nanticoke, Pa. 18634

[21] Appl. No.: 226,643

[22] Filed: Jan. 21, 1981

Related U.S. Application Data

[63] Continuation-in-part of Ser. No. 45,692, Jun. 5, 1979, Pat. No. 4,265,027.

[51] Int. Cl.³ .............................................. G01C 5/02
[52] U.S. Cl. ....................................... 33/291; 33/366; 33/402; 73/483; 73/505
[58] Field of Search ................ 33/291, 366, 402, 353, 33/363, 290; 73/505, 482, 483

[56] References Cited

U.S. PATENT DOCUMENTS

| | | | |
|---|---|---|---|
| 3,486,238 | 12/1969 | Hansen | 33/366 |
| 3,537,307 | 11/1970 | Pliha | 33/366 |
| 3,962,693 | 6/1976 | Schamblin | 33/353 |
| 3,983,636 | 10/1976 | Fashbaugh et al. | 33/291 |
| 3,985,033 | 10/1976 | Ford | 33/366 |
| 4,024,823 | 5/1977 | Ward et al. | 33/366 |
| 4,035,084 | 7/1977 | Ramsay | 33/291 |

*Primary Examiner*—Willis Little
*Attorney, Agent, or Firm*—Lowe, King, Price & Becker

[57] ABSTRACT

A self-leveling instrument mount comprises an instrument table pivotally mounted above a stationary frame on first, second and third vertical support arms. The first support arm is a fixed length member connected to the frame through a ball and socket joint. The second and third support arms are formed of screws extending between the table and frame having effective lengths that are controlled, respectively, by first and second servo motors in response to a pendulum switch to maintain the table parallel to a horizontal reference plane. The pendulum is magnetically damped during operation of the servo motors for stabilization. A mercury switch on the table disables the servo motors when the tilt of the table is too large to be leveled by the support screws.

7 Claims, 13 Drawing Figures

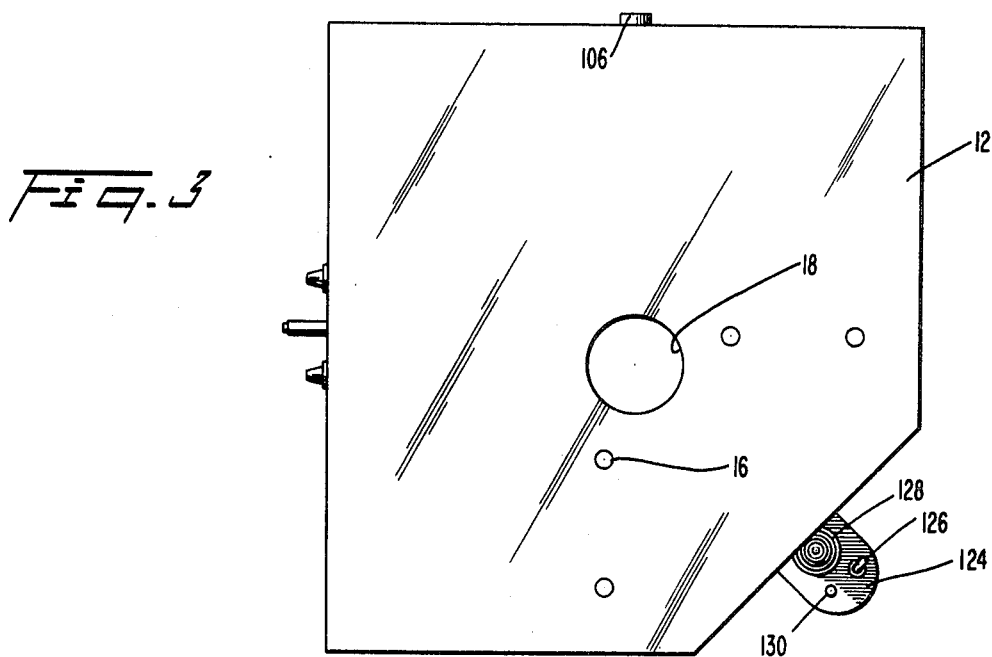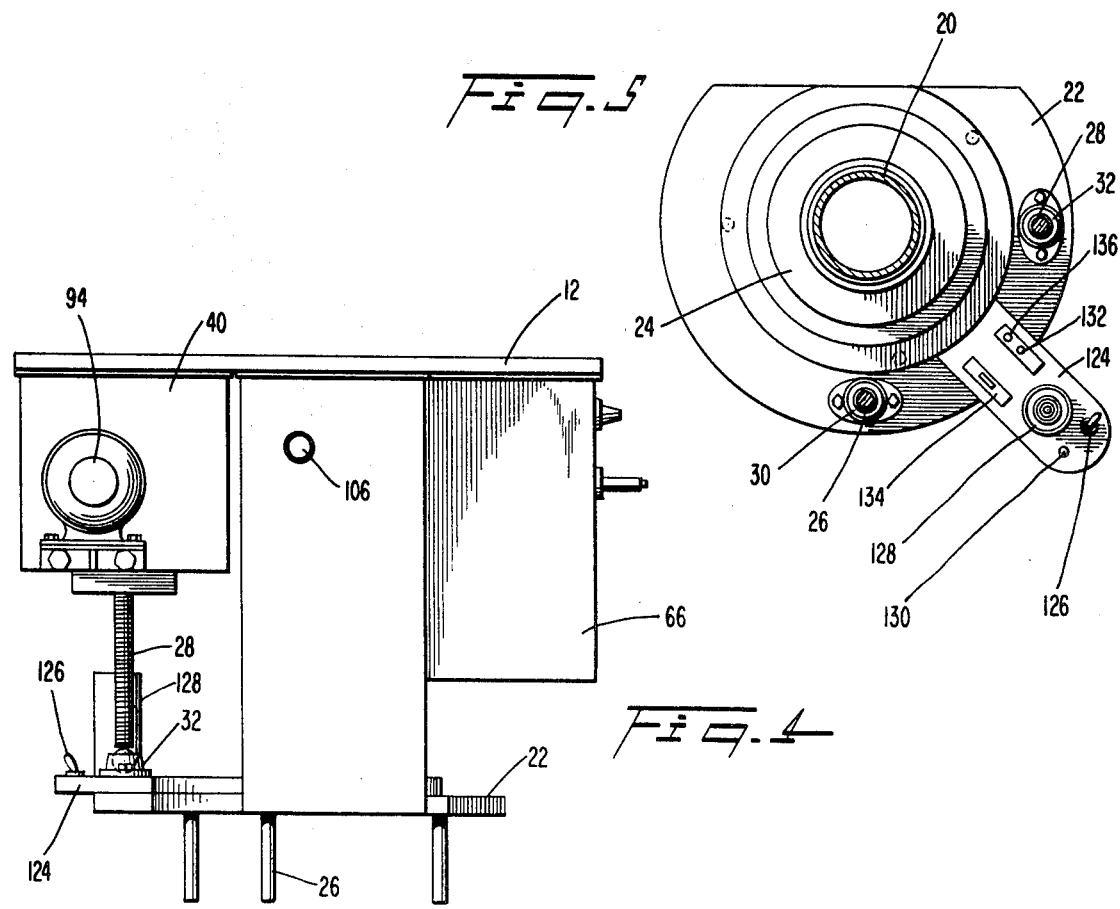

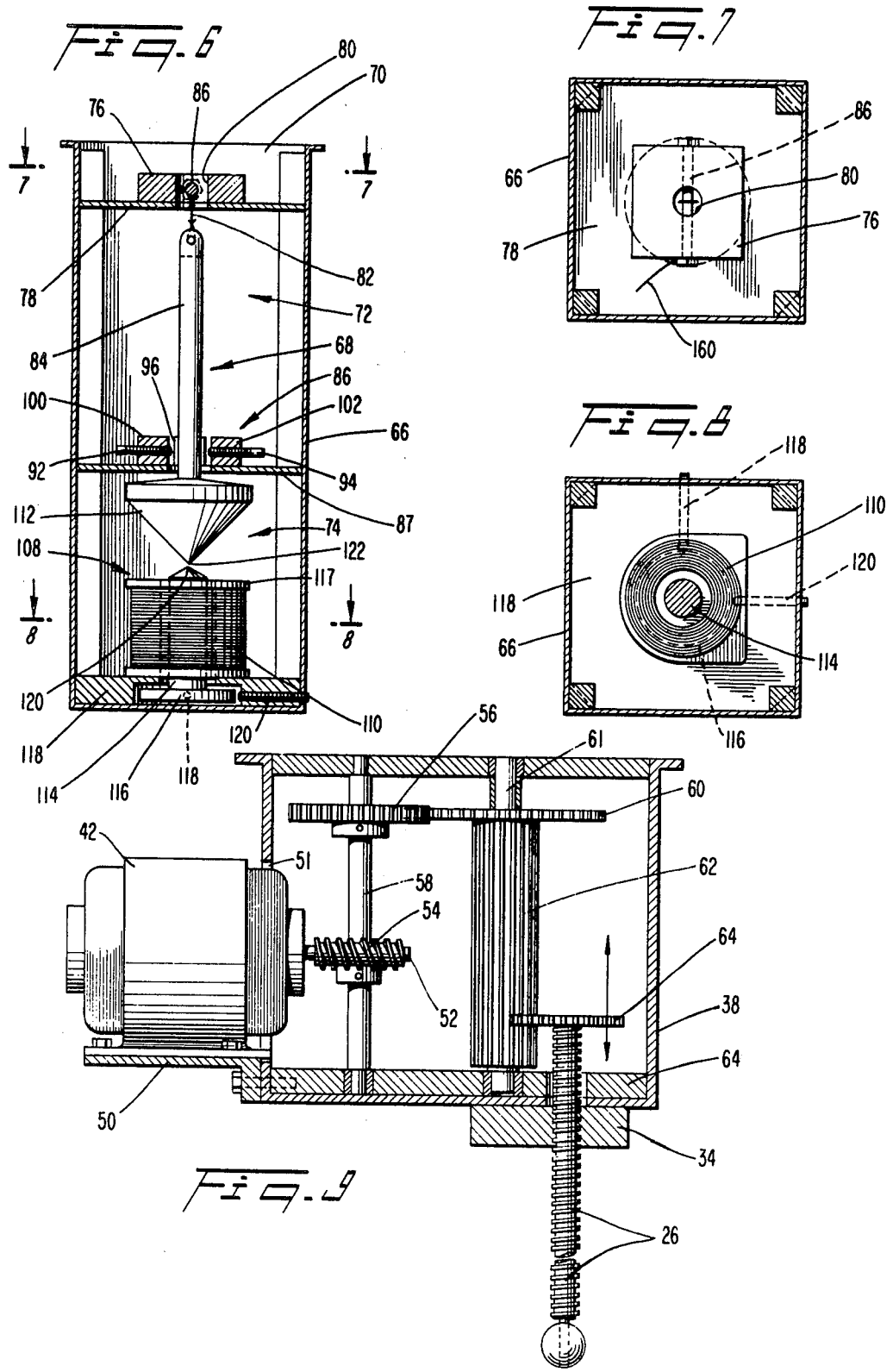

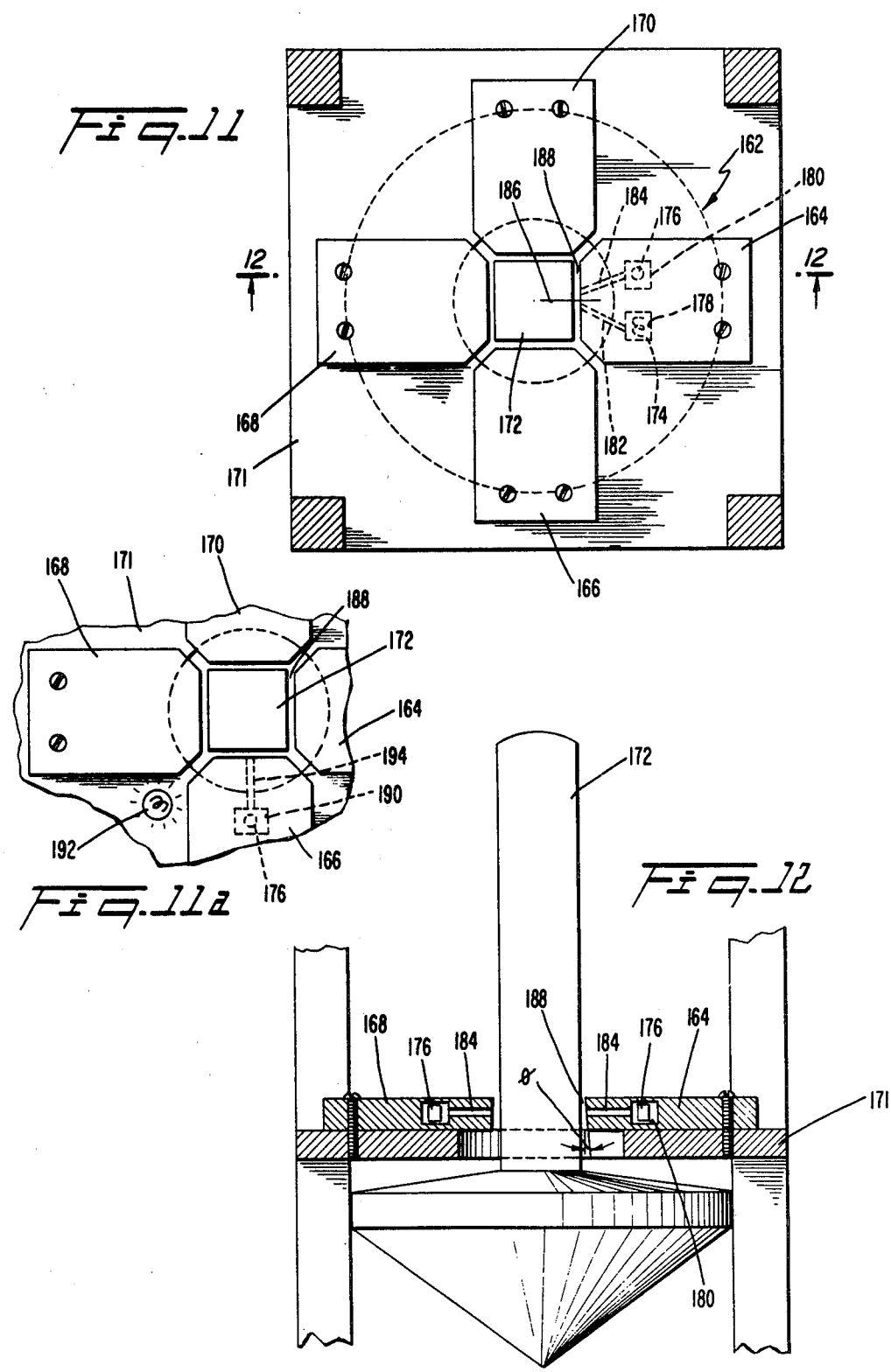

AUTOMATIC SELF-LEVELING INSTRUMENT MOUNT

CROSS REFERENCES TO RELATED APPLICATIONS

The present application is a continuation-in-part application of application Ser. No. 045,692, filed on June 5, 1979, now U.S. Pat. No. 4,265,027.

FIELD OF THE INVENTION

The present invention relates generally to an automatic, self-leveling support member and more particularly toward an instrument mount having a servo operated leveling mechanism for continuously leveling the mount independently of terrain slope.

DESCRIPTION OF THE PRIOR ART

Prior to using a transit or other surveying instrument on site, it is necessary to undergo a leveling operation to compensate for non-horizontal terrain. In the past, these instruments have been leveled by being mounted on a series of stacked, non-uniform thickness, individually rotatable collars or on adjustable length legs that enable the orientation of the instrument to be adjusted about orthogonal horizontal axes. In practice, the operator observes a bubble gauge or blumb and manually adjusts the several collars until the instrument is indicated as being perfectly level. This procedure must be repeated each time the instrument is moved. Also, the instrument has to be releveled each time it is contacted or jarred by the operator or by others causing the instrument to lose its level.

In other environments, telescopes or artillery, for example, must be oriented on a perfectly horizontal plane to provide a reference for tracking. The equipment must be leveled during initial installation and must be releveled from time to time to compensate for shifting support structure.

A primary object of the present invention, therefore, is to provide a new and improved mechanism for automatically retaining the orientation of a support member parallel to a reference plane.

Another object is to provide a new and improved mechanism for continuously and automatically leveling an instrument mount.

Another object is to provide a new and improved, self-leveling mount that continuously maintains orientation of an instrument parallel to a horizontal reference plane.

An additional object of the invention is to provide an automatic self-leveling instrument mount having an alarm that is triggered during a leveling cycle.

A further object is to provide an automatic self-leveling instrument mount having an alarm that is triggered on during a leveling cycle and maintained on until reset to indicate that a leveling cycle has been previously initiated.

A further object of the invention is to provide a new and improved self-leveling instrument mount, wherein the leveling mechanism is automatically disabled upon excessive angular deviation of the table from the horizontal reference plane.

A still further object of the invention is to provide a battery operated, self-leveling instrument mount that consumes a minimum amount of electrical power during operation.

SUMMARY OF THE INVENTION

A self-leveling mount for instrumentation or other equipment, in accordance with the invention, comprises a table supported above a stationary frame on first, second and third vertical support arms. The first vertical support arm has a fixed length with one end welded to the table and the opposite end connected to the frame by a ball and socket joint. The second and third support arms are formed of screws that at one end are pivotally mounted to the frame and at the other end are threaded into gear boxes carried by the table. The gear boxes contain first and second servo motors and gearing for rotating the support screws thereby controlling their effective lengths between the table and frame.

The angular orientation of the table relative to horizontal is measured by a plumb or pendulum within a vacuum housing carried by the table. An electrically conductive wire supporting the pendulum extends downwardly between two mutually orthogonal pairs of opposed electrical contacts. Bidirectional operation of the first and second servo motors is individually or simultaneously controlled depending upon the angular orientation of the table by electrical connections established between the pendulum line which is connected to a battery and any one or two of the four surrounding contacts connected to the servos. Following leveling of the table by clockwise and counterclockwise operation of the support screws, the pendulum line becomes located between and electrically isolated from the four contacts deenergizing the servo motors.

In order to minimize oscillation of the table during a leveling cycle, the pendulum is magnetically damped by an electromagnet located directly beneath the pendulum inside the sealed pendulum housing and energized only during operation of either of the servo motors. A potentiometer is provided to control the magnitude of current supplied by the battery to the coil to control the magnitude of the damping field.

A mercury switch located on the table is responsive to excessive angular deviations of the table from the horizontal reference plane. The mercury switch is connected in circuit with the servo motors to deactivate the motors if a maximum angular deviation of the table is exceeded. Thus, the servos will be prevented from being energized when the angular deviation is so large that it is impossible to level the table using the support screws. This prevents the battery from becoming drained if the table is toppled.

First and second signal lamps are provided on the frame to monitor the operation of the leveling mechanism. The first lamp is energized whenever either of the servo motors is operating to inform the operator that the table is presently undergoing a leveling cycle. The second lamp is triggered on whenever the table undergoes a leveling cycle and remains on thereafter until reset to inform the operator that the table has undergone a previous leveling cycle which indicates, for example, that the instrument has been jarred or moved.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 3 is a top view of the table taken along the line 3—3 in FIG. 1;

FIG. 5 is a cross sectional view of a portion of the table taken along line 5—5 in FIG. 1;

FIG. 6 is a cross sectional view of the pendulum housing exposing the pendulum and damping coil;

FIG. 7 is a cross sectional view of the pendulum housing taken along the line 7—7 in FIG. 6;

FIG. 8 is a cross sectional view of the pendulum housing exposing the damping coil taken along the line 8—8 in FIG. 6;

FIG. 9 is a cross sectional view of one of the gear boxes taken along the line 9—9 in FIG. 2;

FIG. 11 is a top view of a second embodiment of the level detector used in the invention;

FIG. 11a shows a modification of the detector of FIG. 11; and

FIG. 12 is a side view of the level detector shown in FIG. 11.

DETAILED DESCRIPTION OF A PREFERRED EMBODIMENT

Figure 1:
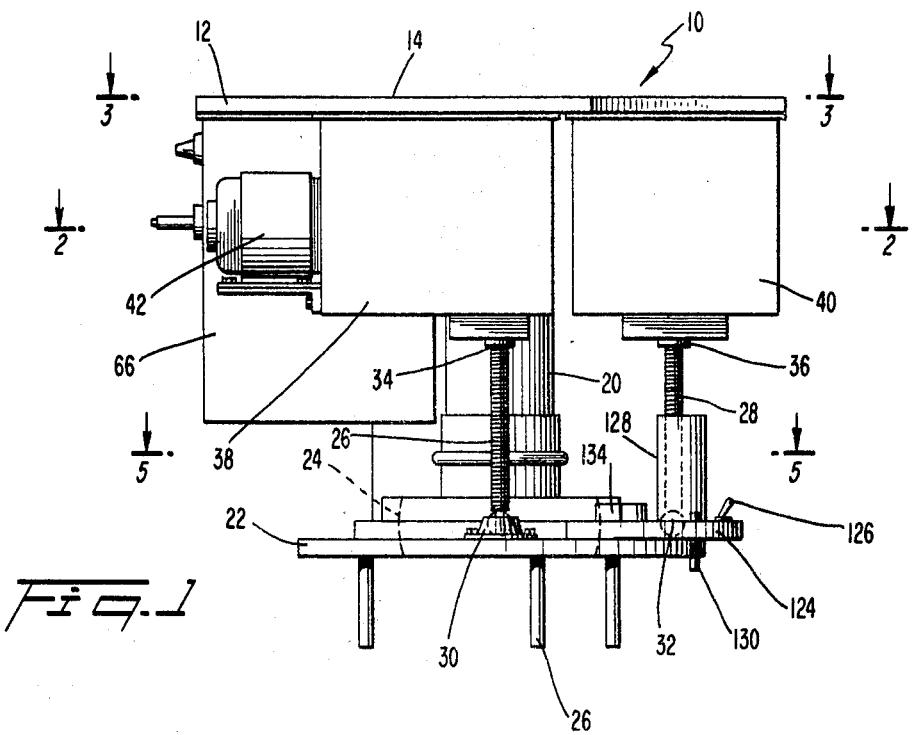
FIG. 1 is a side view of a self-leveling table in accordance with the invention.

Referring to FIGS. 1-4, a self-leveling mount 10 for instrumentation and other equipment such as artillery or airborne or seaborne equipment comprises a table 12 having a flat upper surface 14 to receive an instrument (not shown) to be leveled. The instrument may be mounted on the table surface 14 at mounting holes 16 (FIG. 3) although other mounting means or locations could be provided. At the lower surface of the table 12, one end of a first vertical support arm 20 is welded around an opening 18 formed at or near the center of the table (see FIGS. 1 and 3). The opposite end of the support arm 20 is mounted on a stationary frame 22 within a ball and socket joint 24 enabling the table 12 and arm 20 to pivot about the frame along a 360° arc. Stationary frame 22 is adapted to be mounted by legs 27 to a tripod (not shown) or other stationary base.

The table 12 is also pivotally mounted on the stationary support 22 through second and third vertical arms 26 and 28 which, together with the first arm 20, define the corners of a triangle. The arms 26 and 28 are formed of screws that are pivotally mounted at lower ends thereof in ball and socket joints 30 and 32 at frame 22 and at upper ends thereof within threaded bores 34 and 36 formed in the lower surfaces of gear boxes 38 and 40. The screws 26 and 28 are free to rotate within ball and socket joints 30 and 32 whereby although the length of the arm 20 is fixed between table 12 and stationary support 22, the effective lengths of the screws 26 and 28 are altered by rotation of the two screws forming the vertical arms 26 and 28. Thus, the horizontal orientation of the table 12 can be controlled by individually rotating the arms or screws 26 and 28 clockwise or counterclockwise to cause the table to pivot about the ball and socket joint 24 to attain proper leveling.

The gear boxes 38 and 40 receiving the upper ends of screws 26 and 28, respectively, are coupled to the bottom of the table 12 through pivot members 15, 17 and are angularly displaced from each other by 90 degrees. The ball and socket joints 24, 30 and 32 are all at a common vertical position on stationary support 22, and further, the vertical positions of the threaded bores 34 and 36 are common. The provision of ball joints 30, 32 at the lower ends of screws 26, 28, rather than "feet" besides enabling pivoting of the screws about support 22, rotates the lower ends of the screws with the support. This enables only two screws rather than three as in Ramsay, U.S. Pat. No. 4,035,084 to be used. The pivot members 15, 17 are necessary to provide proper clearance to screws 26, 28 as the ball joints 30, 32 become vertically misaligned with respect to the centers of gear boxes 38, 40 during large angular deviation of the table 12 from horizontal. Other suitable means for providing clearance or "give" to the screws 26, 28 could be provided if desired.

Figure 2:
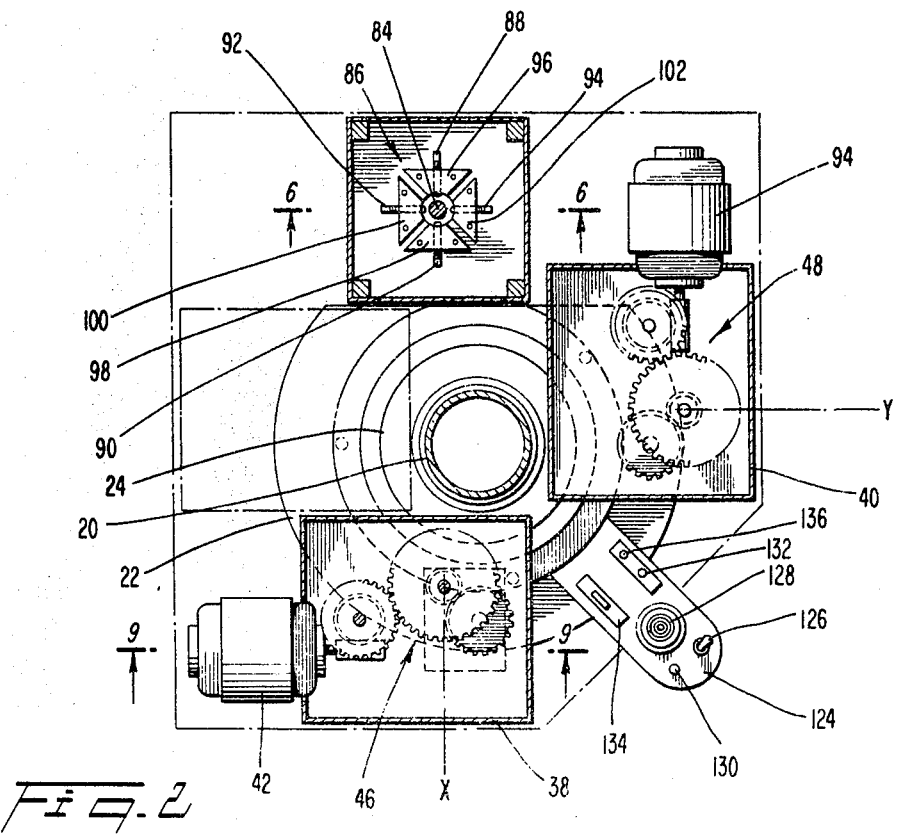
FIG. 2 is a cross sectional top view of the table taken along the line 2—2 in FIG. 1.

Referring to FIG. 2, first and second servo motors 42 and 44 mounted to gear boxes 38 and 40 are coupled to vertical support arms or screws 26 and 28 through gearing 46 and 48, described in detail below in connection with FIG. 9. Thus, the servo motors 42 and 44 rotate screws 26 and 28 to control the angular orientation of the table 23. For example, operation in one direction of servo motor 42 in FIG. 2 will shorten screw 26 to pivot the table 12 on joint 24 about the y axis, whereas operation of the servo 42 in the opposite direction will lengthen screw 26 to pivot the table oppositely about the y axis. Similarly, operation in one direction of servo motor 44 will shorten screw 28 to pivot the table 12 on joint 24 about the x axis, whereas operation in the opposite direction of the motor 44 will lengthen screw 38 for opposite pivoting of the table. As screw 26 or screw 28 lengthens or shortens, the orientation of table 12 changes as it pivots about the lower ball joints 30, 32 and upper pivot members 15, 17.

Although the table 12 is pivoted on stationary frame 22 at ball and socket joint 24 that is located within the frame in the embodiment illustrated herein, the ball and socket joint associated with arm 20 could alternatively be positioned within the table 23 with the arm 20 being welded to the frame. In this alternative embodiment, less overall mass will be moved by the screws 26 and 28 since only the table 12 and not the arm 20 is pivoted.

Referring to FIG. 9, motor 42 is mounted on a bracket 50 bolted to one side of gear box 38 with the shaft 52 of the servo motor extending into the box through opening 51. A worm gear 54 on the motor shaft 52 rotates a first gear 56 through gear shaft 58 journaled on opposite ends of the box 38. The gear 56 is in mesh with a second gear 60 journaled on box 38 at the opposite ends of shaft 61. Shaft 61 of gear 60 carries an elongated gear 62 in mesh with another gear 64 attached to one end of the support screw 26 threaded within member 34.

Rotation of gear 62 by servo 42 causes the support screw 26 to rotate and thus move in the directions of the arrowheads within the bore of member 34 depending upon direction of rotation of the screw 26. The gear 64 slides longitudinally along the surface of screw 62 between sidewall 64 of gear box 38 and second gear 69 to control effective length of support screw 26, i.e., the length of the screw between the table 12 and frame 22.

In a similar manner, the effective length of the second support screw 28 is controlled by bidirectional operation of servo 44. The contents and operation of gear box 40, being identical to those of box 38, however, shall not be described for brevity.

Figure 4:
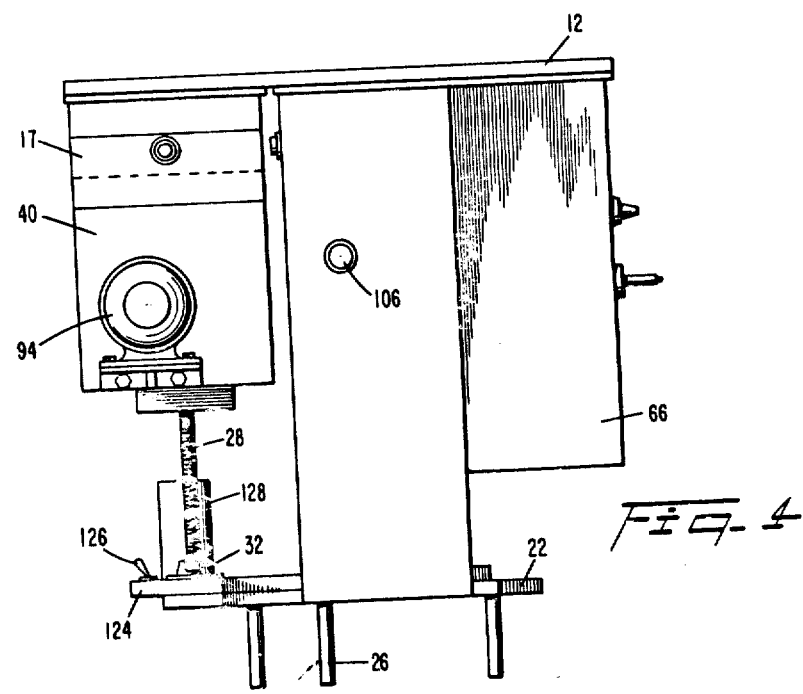
FIG. 4 is a rear view of the self-leveling table.

Referring to FIG. 4, the table 12 also carries a housing 66 containing a pendulum 68 (see also FIG. 6) for monitoring the angular orientation of the table about a horizontal reference plane. The housing 66 is divided into a first, upper compartment 70, a second compartment 72 and a third, lower compartment 74 defined by partitions 78 and 87. The upper compartment 70 contains a pendulum support 76 having a central aperture 80 (FIG. 7) through which a short line 82 is suspended and attached to the upper end of pendulum rod 84. The upper end of the line 82 is threaded around a horizontal member 86 within aperture 80 enabling the line to extend downwardly into compartment 72 along a perfectly vertical axis.

Central compartment 72 of the pendulum housing 66 contains, as best shown in FIG. 2, first and second, mutually orthogonal pairs of opposed electrical contacts identified generally by the numeral 86. The contacts 86 consist of a pair of opposed contacts 88 and 90 as well as an orthogonal, opposed contact pair 92 an 94. The contacts 88-94 are threaded within contact blocks 96, 98, 100 and 102 so that the position of each contact with respect to the center of contact set 86 is individually adjustable to define a gap between the pendulum rod 84 and contacts.

The four contacts 88-94 are electrically connected in circuit to a battery B (FIG. 10) and servo motors 42 and 44 so as to cause the servos to operate clockwise or counterclockwise depending upon table angle to cause the table 12 to become oriented parallel to a horizontal reference plane. The pendulum rod 84, line 82 and pendulum support 86 (see FIGS. 6 and 7) are all formed of electrically conducting materials connected, by wire 160 to the battery B and servos 42 and 44. The pendulum rod 84, line 82 and support 86 are all electrically common with the four contacts 88-94 to constitute elements of four circuits that control respectively clockwise and counterclockwise operation of the two servo motors 42 and 44. Thus, as discussed below in more detail in connection with FIG. 10, when the angular orientation of the table 12 is displaced from horizontal such that the pendulum rod 84 contacts the contact 88 indicating that the table is angularly displaced in one direction about axis y, motor 42 will be energized in a direction to shorten screw 26 and thereby pivot the table 12 toward horizontal. On the other hand, if an electrical connection is established between pendulum rod 84 and the opposite contact 90, the servo motor 42 is operated oppositely to lengthen screw 26 and thereby pivot the table 12 in the opposite direction about axis y toward horizontal. Similarly, an electrical connection established between pendulum rod 84 and contact 92 or contact 94 will control servo motor 44 to operate clockwise or counterclockwise to lengthen or shorten screw 28 and thereby pivot table 12 about axis x in the direction necessary to level the table. The diameter of the rod 84 relative to spacing between the contacts 86 is large enough to enable motors 42, 44 to be energized simultaneously for multiplanar pivoting of table 14.

The size of the gap established between pendulum rod 84 and contacts 88-94 will determine the sensitivity of the servo motors 42 and 44 to angular deviations of the table 12 from the horizontal reference plane. In other words, if the gap is relatively large, motor 42 or 44 will not be energized until the angular deviation of the table 12 from horizontal is also relatively large, whereas the motors will be operated in response to a smaller angular deviation of the table if the gap is small. The trade-off, however, is wear on the contacts 88-94 as well as wear on the motors 42 and 44 in addition to excessive battery drainage due to initiation of frequent leveling cycles. Also, there is a tendency for arcing to occur between the contacts 88-94 and pendulum arm 84 during making and breaking of electrical connections which tends to corrode or pit the pendulum arm and contacts. Arching is minimized by establishing a partial vacuum within the pendulum housing 66 using valve 106 (FIG. 4) to withdraw air from the pendulum housing or alternatively to fill the pendulum housing with an inert gas.

Because there is a tendency for the pendulum 68 to oscillate or flutter before it establishes a stable position between the contacts 88-94, an electromagnetic damper 108 is positioned within lower compartment 74 of pendulum housing 66. Referring to FIGS. 6 and 8, the damper 108 comprises an electromagnetic coil 110 wound on a spool 117 surrounding a metal core 114. The bottom of the core 114 is formed with a disc 116 seated within a plug 118 at the bottom of housing 66. The core 114 of damper 108 is maintained stationary within plug 118 by a pair of set screws 118 and 120 (FIG. 8) extending radially inwardly through the plug into contact with the periphery of disc 116.

The upper end of core 114 is in the form of a point 120, as shown in FIG. 6, and similarly, weight 112 of pendulum 68 has a lower end in the form of a point 122. The pointed ends 122 and 120 of pendulum weight 112 and core 114 are separated from each other by a small gap through which a magnetic flux path is established in response to electrical energization of the coil 110.

When the coil 110 is electrically energized, magnetic flux passing through the gap between end portions 122 and 120 of pendulum weight 112 and magnetic core 114 cause the weight 112 and core 114 to be magnetically attracted to one another to minimize the reluctance path formed by the gap. The magnitude of magnetic attraction between the pendulum weight 112 and electromagnetic core 114 is a function of the magnitude of current flowing through the coil 110. In accordance with one aspect of the invention, as described in more detail below in connection with FIG. 10, the magnitude of current flowing through the coil 110 is controlled by a potentiometer R2, with the coil being energized only during operation of either of the servo motors 42 and 44. Thus, the movement of the pendulum weight 112 is automatically damped during a leveling cycle whereas the magnitude of damping is manually set by the potentiometer and is normally not changed once an adequate damping factor is established.

Preferably, the length of pendulum line 82 is minimum to minimize vibration in the line and to provide a smaller "lever arm" to assist in damping of the pendulum weight 112. The distance between the pendulum support 86 and the bottom 122 of the pendulum is also significant since it also determines the lever arm of the pendulum. If the lever arm is too long, the response of the pendulum will tend to be slow, whereas if the lever arm is too short, the pendulum will tend to be unstable and require a larger damping coil 110 to reduce oscillation.

Referring to FIGS. 3-5, one corner of the table 12 is truncated to expose a horizontal platform 124 carrying an on/off switch 126, a mercury limit switch 128 and lamps 130 and 132 as well as a reset button 136. The platform 124 may also carry a digital readout 134 for displaying the coordinates of angular orientation of the table 12.

As described below in more detail in connection with the circuit in FIG. 10, the lamp 130 is triggered during operation of either servo motor 42 or servo motor 44 indicating that the table 12 is presently undergoing a leveling cycle. The second lamp 132 is triggered during a leveling cycle and is maintained on until manually reset at reset button 136. The purpose of lamp 132 is to alert the operator that a leveling cycle has previously been initiated indicating that the instrument may have been previously jarred or repositioned.

The mercury limit switch 128 detects excessive angular deviation of the table 12 from the horizontal reference plane is disable the servo motors 42 and 44. This prevents the battery from being drained while the servos 42 and 44 are pivoting the table toward the horizontal in the event that the angular deviation of the table is so great that it is not possible to level the table by the screws 26 and 28. This would occur, for example, when the system 10 is toppled or is resting on an excessive grade.

Figure 10:
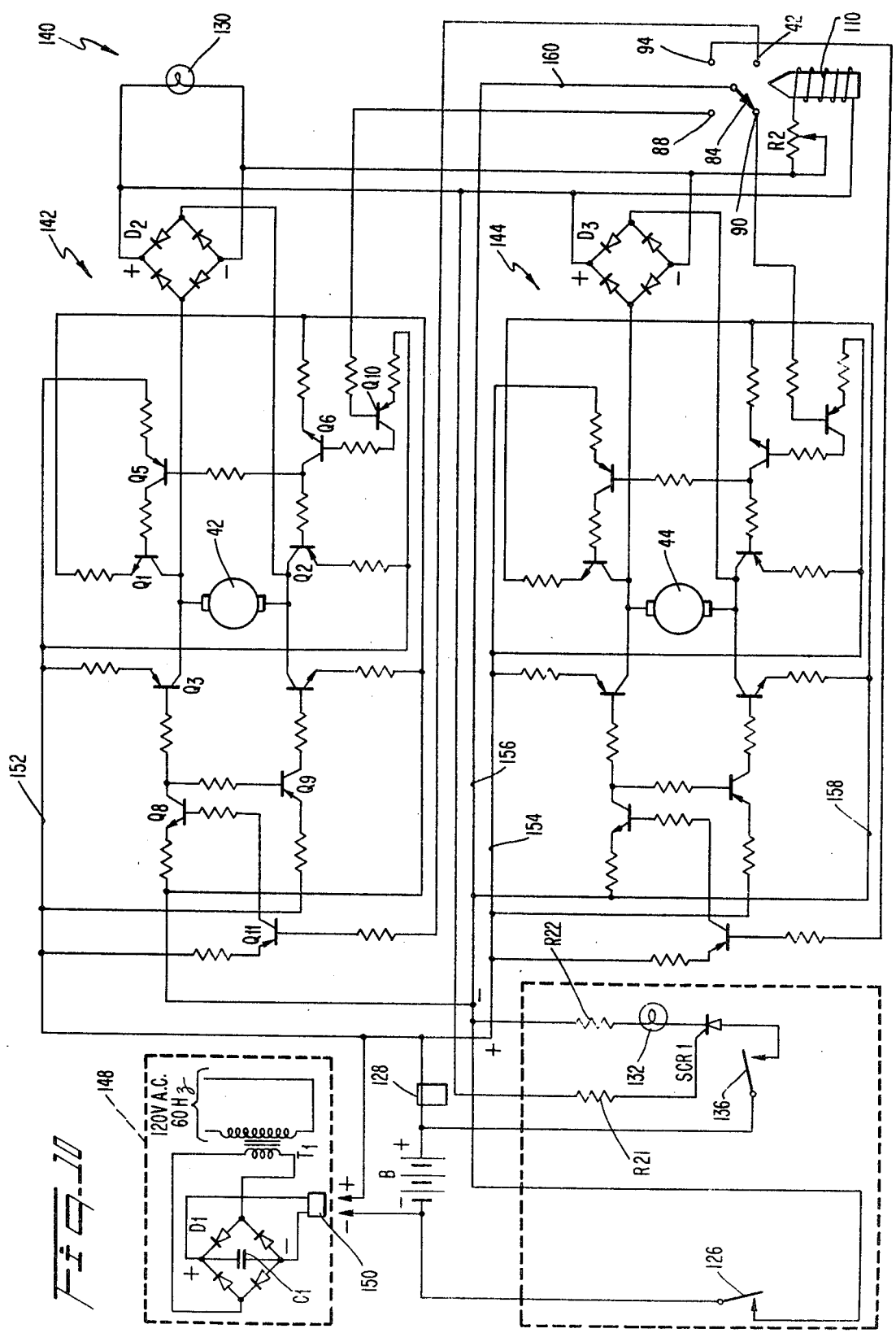
FIG. 10 is a schematic diagram of a circuit for controlling operation of the servo motors, damping coil and displays.
Figure 1:
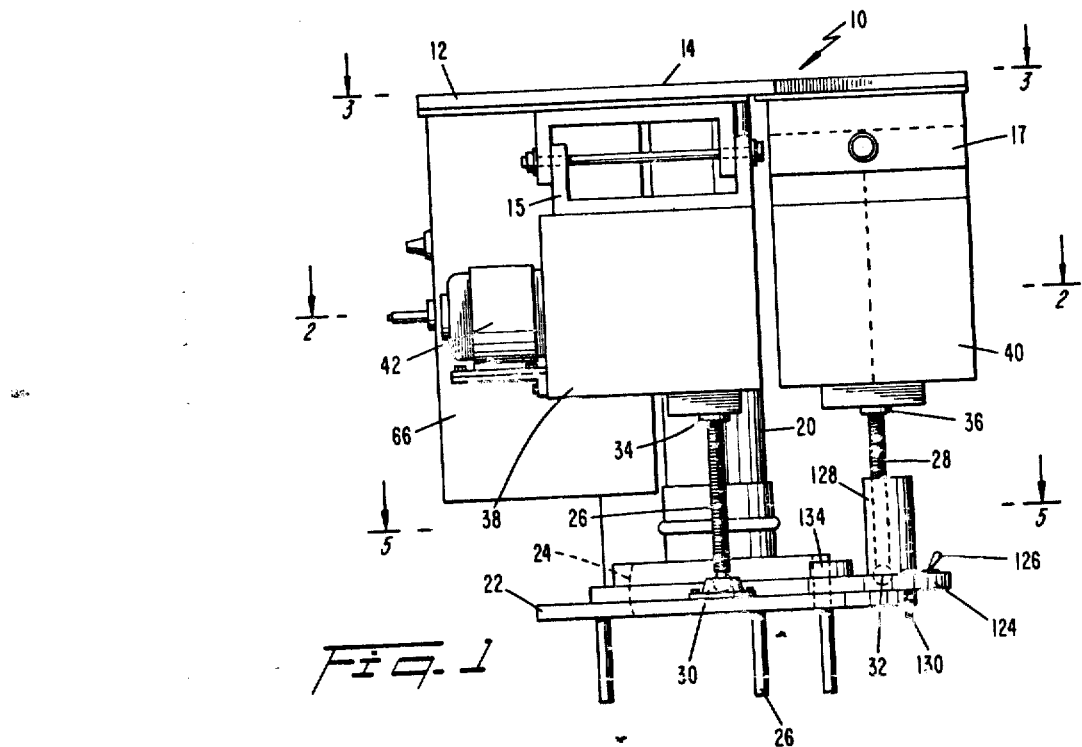

Referring to FIG. 10, circuitry designated generally by the numeral 140 for operating the apparatus 10 comprises two identical circuits 142 and 144 associated, respectively, with servo motors 42 and 44. The circuitry 140 is powered by a battery B together with an optional, line operated power supply 148 containing a transformer $T_1$ for stepping down commercial line voltage, a full wave bridge rectifier $D_1$ connected to the secondary of transformer $T_1$ and a filter capacitor $C_1$, all connectable across battery B through plug 150. The positive terminal of battery B is connected to lines 152 and 154 respectively of circuits 142 and 144. The negative terminal of battery B is connected through toggle switch 126 to grounds 156 and 158 respectively of circuits 142 and 144.

Since the circuit 144 associated with servo motor 44 is identical to circuit 142 associated with servo motor 42, only the circuit 142 will be described in detail for brevity. Both circuits 142 and 144 are responsive to connections established between pendulum arm 84 and stationary contacts 88-94 (see also FIG. 2) to control bidirectional operation of servo motors 42 and 44 as described above. The positive terminal of battery B is electrically disconnected from circuit lines 152 and 154 upon opening of mercury switch 128 indicating excessive tilt of the table 12. Lamp 130 connected across diode bridges $D_2$ and $D_3$ is energized only during operation of either servo 42, 44. Lamp 132 connected to battery B through SCR 1 which is gate triggered on through resistor $R_{21}$ from bridges $D_2$, $D_3$ whenever servo motor 42 or servo motor 44 is energized. Once triggered by operation of either or both of servo motor 42 and servo motor 44, the SCR 1 will remain on maintaining lamp 132 energized, even if mercury switch 28 is open, until current flow through the SCR is interrupted by an opening of switch 136. This DC current latching characteristic of SCR 1 enables the operator to determine whether the table 12 has undergone a previous leveling cycle during his absence indicating that the table has been tampered with or has had its position otherwise altered.

The negative terminal battery B is electrically connected to pendulum arm 84 through wire 160 as well as line 82 (FIGS. 6 and 7). Considering only servo motor 42 and circuit 142, the motor 42 is energized to rotate clockwise when an electrical connection is established between pendulum arm 84 and contact 92. Similarly, the motor 42 is driven counterclockwise when an electrical connection is established between the pendulum arm 84 and contact 88. The contact 92 is electrically connected to the base of transistor $Q_1$ having an emitter connected to positive supply line 152 and a collector connected to the base of grounded emitter transistor $Q_8$. The collector of transistor $Q_8$ in turn is connected to the base of transistor $Q_9$ having an emitter connected to positive line 152 and a collector driving the base of power transistor $Q_4$. The collector of transistor $Q_8$ also drives the base of power transistor $Q_3$ having an emitter connected to the positive supply line 152. The collectors of power transistors $Q_3$ and $Q_4$ are connected to opposite terminals of motor 42.

Stationary contact 88 is connected to the base of transistor $Q_{10}$ having an emitter connected to the positive supply line 152 and a collector driving the base of grounded emitter transistor $Q_6$. The collector transistor $Q_6$ drives the base of transistor $Q_5$ having an emitter connected to the positive supply line 152 and also drives the base of grounded emitter transistor $Q_2$. The collector of transistor $Q_5$ drives the base of grounded emitter power transistor $Q_1$. The collectors of power transistors $Q_1$ and $Q_2$ are connected to opposite terminals of servo motor 42.

In operation, assuming that pendulum arm 84 is in electrical contact with neither contact 88 nor contact 92, the base of transistor $Q_{10}$ and the base of transistor $Q_{11}$ are floating, so that each transistor is off and all the remaining transistors in circuit 142 are also turned off, maintaining the servo motor 142 deenergized and isolated from battery B by the reverse biased collector-emitter junctions of power transistors $Q_1$-$Q_4$.

Assuming now that an electrical connection is established between pendulum arm 84 and contact 88, the base of transistor $Q_{10}$ becomes connected to ground, turning on transistors $Q_{10}$, $Q_6$, $Q_2$, $Q_5$ and $Q_1$. Current thus flows through power transistors $Q_2$ and $Q_1$ as well as through motor 42, driving the motor clockwise.

If the pendulum rod 84 is now separated from contact 88 and a connection established with contact 92, the base of transistor $Q_{11}$ becomes grounded, turning on transistors $Q_8$, $Q_9$, $Q_3$ and $Q_4$. Current thus flows through power transistors $Q_3$, $Q_4$ and servo motor 42 driving servo motor 42 counterclockwise.

Full wave rectifier bridge $D_2$, connected across the terminals of servo motor 42, supplies a full wave rectified DC voltage directly to lamp 130 and to damping coil 110 through potentiometer $R_{21}$. Of course, a full wave rectified voltage is similarly supplied to lamp 130 of damping coil 110 by bridge $D_3$ connected across the other servo motor 44. The use of individual bridges $D_2$, $D_3$ at the outputs of circuits 142, 144 provides electrical isolation between the circuits to prevent any interaction whenever the servos 42 and 44 are energized simultaneously. Thus, clockwise and counterclockwise operation of the servo motors 42 and 44 are controlled individually by pendulum arm 84 and electrical contacts 88-94, whereas the damping coil 110 as well as lamp 130 is energized in response to clockwise or counterclockwise rotation of either of the servos.

Thus, I have provided a unique self-leveling table that is pivotably mounted on a stationary frame by three vertical support arms, one of which has a fixed length and the other two of which have effective lengths that are automatically controlled by servo motors in response to a pendulum to achieve a precisely level orientation. Of particular importance, very little power is consumed from the battery source, since in a quiescent, level orientation of the table 12, servos 42, 44 are de-energized; the servos are energized by the battery only by an amount necessary to complete a leveling cycle.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, it is understood that the particular load on table 12 to be leveled is arbitrary.

For example, referring to FIGS. 11 and 12, another embodiment of the invention is illustrated wherein electrical contacts 84 for controlling servos 42 and 44 in response to the position of pendulum rod 84 are replaced by a contactless, photoelectric switching arrangement designated generally by the numeral 162. The photoelectric switching arrangement 162 comprises a mutually orthogonal series of blocks 164, 166, 168 and 170 bolted onto horizontal support 171 (FIG. 13); these blocks correspond respectively to contact blocks 96, 98, 100 and 102 shown in FIG. 2. The blocks 164-170 face and are closely spaced apart from the four sides of a square cross section pendulum rod 172. The distances between the facing surfaces of blocks 164-170 and corresponding sides of pendulum rod 172, which are equal to each other when the pendulum rod is in equilibrium with table 12 oriented on a horizontal plane, must be small enough to ensure high leveling accuracy, yet large enough to pass a measureable quantity of light. In practice, I have found an equilibrium distance on the order of several mils to be optimum.

Considering block 164 for the purpose of illustration (FIG 11), cavities 178 and 180 within each of the blocks 164-170 house, respectively, a lamp 174 and photodetector 176 laterally spaced apart from each other. Electrical connections between lamp 174 and circuit 140 shown in FIG. 10 and between photodetector 176 and the circuitry are completed by wiring (not shown) extending through the block 164. Light generated by lamp 174 passes through a first tunnel 182 and is directed across gap 188 on the surface of pendulum rod 172 to be reflected back across the gap to photodetector 176 through a second tunnel 184. The angle between tunnel 182 and center axis 186 of block 164 is equal to the angle between tunnel 184 and the axis to ensure maximum transmission of light between the lamp 174 and photodetector 176 by reflection from the surface of pendulum rod 172.

During equilibrium, when the pendulum rod 172 is separated from the facing surface of block 164, light reflected from the rod surface impinges on photodetector 176 causing it to have a low internal impedance. When there is contact between pendulum rod 172 and block 164, however, transmission of light between lamp 174 and photodetector 176 is terminated, causing the internal impedance of photodetector 176 to substantially increase. Since there is transmission of light between lamp 174 and photodetector 176 only when pendulum rod 186 and block 164 are separated from each other to establish the gap 188, the output of photodetector 176 indicates to the circuitry 140 in FIG. 10 the position of pendulum rod 172 with respect to the four contact blocks 164-170 (i.e., whether there is physical contact) to control table leveling servo motors 42 and 44.

In order to ensure that there is no leakage of light to photodetector 176 caused by imperfect contact between pendulum rod 172 and block 164 due to the slight departure of the rod from a perfectly vertical axis, the facing surfaces of the blocks 164-170 are bevelled slightly inwardly by an angle $\theta$ to be contiguous with the rod as shown in FIG. 12. The size of the angle $\theta$ is a function of the distance between blocks 164-170 and the pivot point (corresponding to 86 in FIG. 6) of the pendulum rod 172.

The intensity of lamp 174 is large enough to ensure adequate transmission of light to photodetector 176 through gap 188 and the photodetector is biased into a sensitive portion of its operating region. Although the lamp 174 is illustrated as being an incandescent lamp in FIG. 11, it is to be understood that the lamp could, if desired, be in the form of a light emitting diode (LED). Dispersion of light through tunnels 182 and 184 is large enough to ensure transmission of reflected light through the photodetector tunnel 184 at all times while the pendulum arm 186 is out of contact with block 164. Although not shown in FIG. 11, transmission of light between the lamp 174 and photodetector 176 can be improved by locating optical fibers within the tunnels 182 and 184 to reduce light absorption by the tunnel walls.

As an alternative, each of the blocks 164-170 may be provided with only a photodetector to be illuminated by ambient lighting through gap 188. Referring to FIG. 11a, block 166, for the purpose of illustration, is provided with a single cavity 190 containing photodetector 176 that is illuminated by ambient lighting generated by lamp 192 through gap 188. When pendulum arm 172 is in contact with block 166, however, light to photodetector 176 through tunnel 194 is blocked by the pendulum arm 172 causing the internal impedance of the detector to substantially increase and thereby generate an electrical signal to circuitry 140 to operate servos 42, 44.

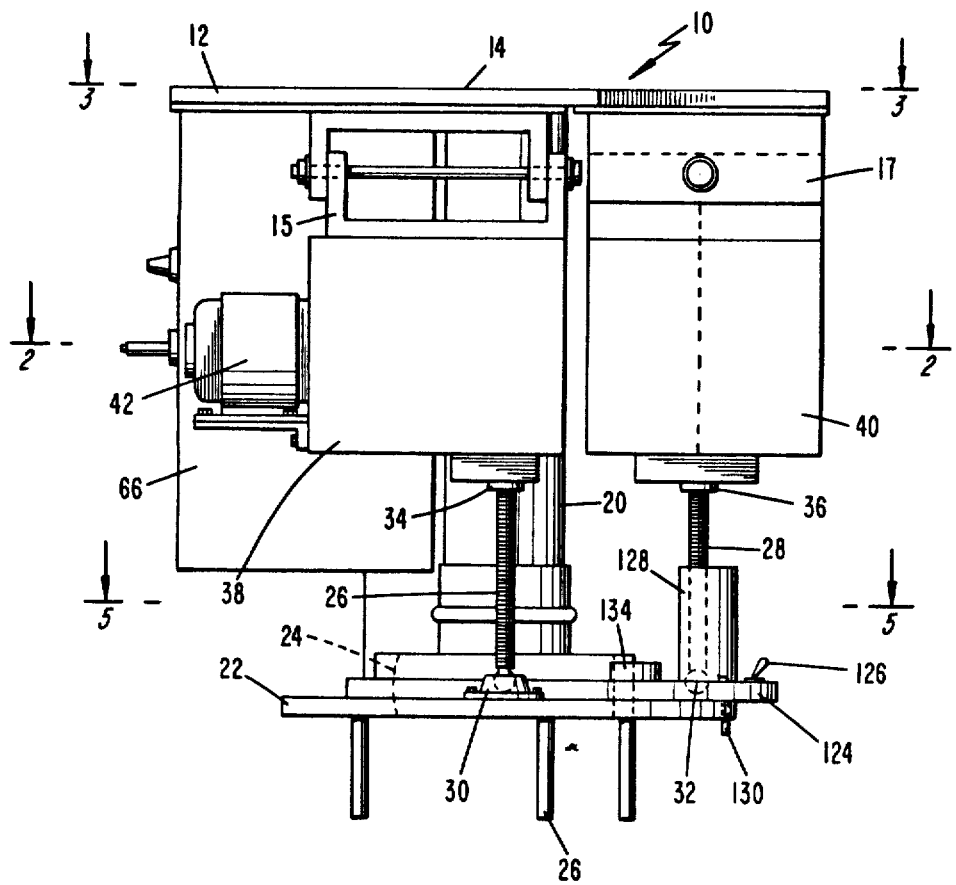

I claim:

1. A self-levelling mount, comprising:
   a table having a surface to be oriented parallel to a reference plane;
   a stationary frame member;
   a first, fixed length support arm pivotally connected between said table and said frame member;
   second and third, variable length support arms connected between said table and said frame member, said second and third variable length support arms being pivotally connected and retained to said frame member by first pivot members, said variable length support arms being coupled to said table through second pivot members;
   said first, second and third arms being oriented in a triangular array; and
   means for controlling the lengths of said second and third arms to orient said table relative to the reference plane.

2. The apparatus of claim 1, including means entirely mounted with said table for measuring the orientation of said table relative to the reference plane; and
   servo means responsive to said measuring means for controlling effective lengths of said second and third support arms to orient said table relative to said reference plane.

3. The apparatus of claim 2, wherein said measuring means includes a pendulum suspended from a pendulum support carried by said table.

4. The apparatus of claim 2, wherein said measuring means includes photoelectric means for monitoring the orientation of said table.

5. The apparatus of claim 3, wherein said pendulum is electrically conducting and is suspended by an electrically conducting line, said pendulum extending downwardly between first and second, mutually orthogonal pairs of opposed electrical contacts, said pendulum being electrically isolated from said contacts when said table is horizontal, an electrical connection being established between said electrically conducting pendulum at said contacts depending upon an angular displacement of said table relative to horizontal, said servo means being responsive to said electrical connection.

6. The apparatus of claim 3, including photoelectric means responsive to a position of said pendulum for controlling said servo means.

7. The apparatus of claim 1, wherein said first pivot members comprise ball joints.

* * * * *

UNITED STATES PATENT AND TRADEMARK OFFICE
CERTIFICATE OF CORRECTION

PATENT NO. : 4,370,813                    Page 1 of 3
DATED      : Feb. 1, 1983
INVENTOR(S): Edward W. Burniski It is certified that error appears in the above-identified patent and that said Letters Patent is hereby corrected as shown below:

The title page should be deleted to appear as per attached title page.
Figures 1 and 4 of the drawings should be deleted to appear as per attached sheet.

Signed and Sealed this

*Seventeenth* Day of *January 1984*

[SEAL]

*Attest:*

GERALD J. MOSSINGHOFF

*Attesting Officer*      *Commissioner of Patents and Trademarks*

United States Patent [19]

Burniski

[11] 4,370,813
[45] Feb. 1, 1983

[54] AUTOMATIC SELF-LEVELING INSTRUMENT MOUNT

[76] Inventor: Edward W. Burniski, 152 Sharp St., Alden Station, Nanticoke, Pa. 18634

[21] Appl. No.: 226,643

[22] Filed: Jan. 21, 1981

Related U.S. Application Data

[63] Continuation-in-part of Ser. No. 45,692, Jun. 5, 1979, Pat. No. 4,265,027.

[51] Int. Cl.³ .............................................. G01C 5/02
[52] U.S. Cl. .................................... 33/291; 33/366; 33/402; 73/483; 73/505
[58] Field of Search ................ 33/291, 366, 402, 353, 33/363, 290; 73/505, 482, 483

[56] References Cited

U.S. PATENT DOCUMENTS

| | | | |
|---|---|---|---|
| 3,486,238 | 12/1969 | Hansen | 33/366 |
| 3,537,307 | 11/1970 | Pliha | 33/366 |
| 3,962,693 | 6/1976 | Schamblin | 33/353 |
| 3,983,636 | 10/1976 | Fashbaugh et al. | 33/291 |
| 3,985,033 | 10/1976 | Ford | 33/366 |
| 4,024,823 | 5/1977 | Ward et al. | 33/366 |
| 4,035,084 | 7/1977 | Ramsay | 33/291 |

*Primary Examiner*—Willis Little
*Attorney, Agent, or Firm*—Lowe, King, Price & Becker

[57] ABSTRACT

A self-leveling instrument mount comprises an instrument table pivotally mounted above a stationary frame on first, second and third vertical support arms. The first support arm is a fixed length member connected to the frame through a ball and socket joint. The second and third support arms are formed of screws extending between the table and frame having effective lengths that are controlled, respectively, by first and second servo motors in response to a pendulum switch to maintain the table parallel to a horizontal reference plane. The pendulum is magnetically damped during operation of the servo motors for stabilization. A mercury switch on the table disables the servo motors when the tilt of the table is too large to be leveled by the support screws.

7 Claims, 13 Drawing Figures